US012335754B2

(12) United States Patent
Hao et al.

(10) Patent No.: US 12,335,754 B2
(45) Date of Patent: Jun. 17, 2025

(54) UPLINK MEASUREMENT MANAGEMENT METHOD, APPARATUS, AND SYSTEM

(71) Applicant: HUAWEI TECHNOLOGIES CO., LTD., Guangdong (CN)

(72) Inventors: Jinping Hao, Shanghai (CN); Bin Xu, Shanghai (CN); Ting Yao, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 410 days.

(21) Appl. No.: 17/987,115

(22) Filed: Nov. 15, 2022

(65) Prior Publication Data

US 2023/0093234 A1 Mar. 23, 2023

Related U.S. Application Data

(63) Continuation of application No. PCT/CN2021/093967, filed on May 15, 2021.

(30) Foreign Application Priority Data

May 20, 2020 (CN) .......................... 202010432168.5

(51) Int. Cl.
*H04W 24/06* (2009.01)
*H04W 24/10* (2009.01)
*H04W 72/23* (2023.01)

(52) U.S. Cl.
CPC ........... *H04W 24/06* (2013.01); *H04W 24/10* (2013.01); *H04W 72/23* (2023.01)

(58) Field of Classification Search
CPC ..... H04W 24/06; H04W 24/10; H04W 72/23; H04W 88/085; H04W 64/00;
(Continued)

(56) References Cited

U.S. PATENT DOCUMENTS

| 2020/0137715 | A1 | 4/2020 | Edge et al. | |
| 2021/0235301 | A1* | 7/2021 | Abedini | H04W 72/23 |
| 2024/0397362 | A1* | 11/2024 | Yao | H04W 24/10 |

FOREIGN PATENT DOCUMENTS

| CN | 101330732 A | 12/2008 |
| CN | 110913472 A | 3/2020 |

(Continued)

OTHER PUBLICATIONS

Qualcomm Incorporated: "DL and UL NR Positioning Procedures", 3GPP Draft; R2-1909416, Aug. 16, 2019, XP051767216 .total 10 pages.

(Continued)

*Primary Examiner* — Kyaw Z Soe

(57) ABSTRACT

Embodiments of this application provide an uplink measurement management method. The method includes: A radio access network (RAN) device receives a first message from a positioning device, where the first message is used by the positioning device to request the RAN device to perform uplink measurement, and the first message includes a measurement periodicity and a measurement amount. The RAN device measures an uplink sounding reference signal (SRS) of a terminal device based on the measurement periodicity and the measurement amount, and sends a first response to the positioning device, where the first response includes a measurement result of the uplink SRS.

23 Claims, 6 Drawing Sheets

(58) Field of Classification Search
CPC .... H04W 24/08; G01S 5/0221; G01S 5/0063; G01S 5/0236
See application file for complete search history.

(56) References Cited

FOREIGN PATENT DOCUMENTS

| | | |
|---|---|---|
| WO | 2020064120 A1 | 4/2020 |
| WO | 2020073644 A1 | 4/2020 |

OTHER PUBLICATIONS

Qualcomm Incorporated: "Comparison of 5GC-LMF and RAN-LMC based Positioning",3GPP Draft; R3-195824, Oct. 2019, XP051792843 .total 14 pages.
3GPP TS 38.305 V16.0.0 (Mar. 2020), 3rd Generation Partnership Project; Technical Specification Group Radio Access Network; NG Radio Access Network (NG-RAN); Stage 2 functional specification of User Equipment (UE) positioning in NG-RAN(Release 16), 107 pages.
3GPP TS 38.401 V16.1.0 (Mar. 2020), 3rd Generation Partnership Project; Technical Specification Group Radio Access Network; NG-RAN; Architecture description(Release 16), 50 pages.
3GPP TS 36.459 V15.0.0 (Jun. 2018), 3rd Generation Partnership Project; Technical Specification Group Radio Access Network; Evolved Universal Terrestrial Radio Access Network (E-UTRAN); SLm interface Application Protocol (SLmAP) (Release 15), 47 pages.
R2-2002241, Intel Corporation et al., 3GPP TSG-RAN WG2 Meeting #109 electronic, Elbonia, Feb. 24 Mar. 6, 2020, 64 pages.
3GPP TS 38.455 V15.2.1 (Jan. 2019), 3rd Generation Partnership Project; Technical Specification Group Radio Access Network; NG-RAN; NR Positioning Protocol A (NRPPa) (Release 15), 60 pages.

* cited by examiner

UPLINK MEASUREMENT MANAGEMENT METHOD, APPARATUS, AND SYSTEM

CROSS-REFERENCE TO RELATED APPLICATIONS

This application is a continuation of International Application No. PCT/CN2021/093967, filed on May 15, 2021, which claims priority to Chinese Patent Application No. 202010432168.5, filed on May 20, 2020. The disclosures of the aforementioned applications are hereby incorporated by reference in their entireties.

TECHNICAL FIELD

The present disclosure relates to the wireless communication field, and in particular, to an uplink measurement management method, an apparatus, and a system.

BACKGROUND

With rapid development of wireless communication technologies, a 5th generation (5G) wireless communication technology has become a popular subject in the industry currently. 5G supports a variety of application requirements, including support of an access capability characterized by higher-rate experience and higher bandwidth, information exchange characterized by a lower latency and high reliability, access and management of larger-scale and low-cost machine-type communication devices, and the like. Location information of terminal devices becomes an important basis for 5G that is pervasive in network applications. Diversified business application scenarios can be constructed based on the location information of the terminal devices.

In 3GPP, a plurality of terminal device positioning technologies are defined. The technologies include an uplink measurement-based positioning technology. A basic manner of the uplink measurement-based positioning technology is that a terminal device sends a reference signal, a plurality of network devices measure the reference signal, and report a measurement result to a positioning device, and the positioning device determines a physical location of the terminal device based on the measurement result reported by the plurality of network devices. How to ensure that the positioning device normally manages these network devices is an urgent problem to be resolved currently.

SUMMARY

Embodiments of this application provide an uplink measurement management method, to effectively reduce network resource and signaling overheads.

The following describes this application from a plurality of aspects. It is easy to understand that implementations of the plurality of aspects may be mutually referenced.

According to a first aspect, this application provides an uplink measurement management method. The method includes: A radio access network (RAN) device receives a first message from a positioning device, where the first message is used by the positioning device to request the RAN device to perform uplink measurement, and the first message includes a measurement periodicity and a measurement amount. The RAN device measures an uplink sounding reference signal (SRS) of a terminal device based on the measurement periodicity and the measurement amount. In addition, the RAN device sends a first response to the positioning device, where the first response includes a measurement result of the uplink SRS.

It can be learned that according to the method provided in this embodiment of this application, the RAN device stops measuring the uplink SRS and reporting the corresponding measurement result under a condition of the measurement amount specified by the positioning device, to avoid resource waste and signaling overheads caused because the RAN device cannot stop periodic measurement and periodic reporting due to a reason of the positioning device.

In a possible implementation, that the RAN device measures an uplink SRS of a terminal device based on the measurement periodicity and the measurement amount includes: The RAN device measures the uplink SRS based on the measurement periodicity; and after an amount of measuring the uplink SRS by the RAN device reaches the measurement amount, the RAN device stops measuring the uplink SRS.

In a possible implementation, that the RAN device sends a first response to the positioning device includes: After an amount of measuring the uplink SRS by the RAN device reaches the measurement amount, the RAN device stops sending the first response to the positioning device.

In a possible implementation, the measurement result of the uplink SRS includes at least one of the following parameters: signal strength of the uplink SRS received by the RAN device, information about time of arrival of the uplink SRS received by the RAN device, or information about an angle of arrival of the uplink SRS received by the RAN device.

In a possible implementation, the RAN device includes any one of the following devices: a serving RAN device of the terminal device, a first central unit (CU) connected to a serving distributed unit (DU) of the terminal device, a first central unit-control plane unit (CU-CP) included in the first CU, a neighboring-cell RAN device of the terminal device, a second central unit (CU) connected to a neighboring-cell DU of the terminal device, or a second CU-CP included in the second CU.

In a possible implementation, the positioning device is a location management function (LMF).

In a possible implementation, the first message is a new radio (NR) positioning protocol A (NRPPa) measurement request message.

In a possible implementation, the first response is an NRPPa measurement report message.

According to a second aspect, a positioning device sends a first message to a radio access network (RAN) device, where the first message is used by the positioning device to request the RAN device to perform uplink measurement, and the first message includes a measurement periodicity and a measurement amount. The positioning device receives a first response from the RAN device, where the first response includes a measurement result of an uplink sounding reference signal (SRS).

It can be learned that according to the method provided in this embodiment of this application, the positioning device indicates the RAN device to stop measuring the uplink SRS and reporting the corresponding measurement result under a condition of the specified measurement amount, to avoid resource waste and signaling overheads caused because the RAN device cannot stop periodic measurement and periodic reporting due to a reason of the positioning device.

In a possible implementation, the measurement result of the uplink SRS includes at least one of the following parameters: signal strength of the uplink SRS received by the RAN device, information about time of arrival of the uplink SRS received by the RAN device, or information about an angle of arrival of the uplink SRS received by the RAN device.

In a possible implementation, the RAN device includes any one of the following devices: a serving RAN device of a terminal device, a first central unit (CU) connected to a serving distributed unit (DU) of the terminal device, a first CU-CP included in the first CU, a neighboring-cell RAN device of the terminal device, a second central unit (CU) connected to a neighboring-cell DU of the terminal device, or a second CU-CP included in the second CU.

In a possible implementation, the positioning device is a location management function (LMF).

In a possible implementation, the first message is an NR positioning protocol A (NRPPa) measurement request message.

In a possible implementation, the first response is an NRPPa measurement report message.

According to a third aspect, this application provides an uplink measurement management method. The method includes: A radio access network (RAN) device receives a first message from a positioning device, where the first message is used by the positioning device to request the RAN device to perform uplink measurement, and the first message includes a measurement periodicity and a measurement interval. The RAN device measures an uplink sounding reference signal (SRS) of a terminal device based on the measurement periodicity and the measurement interval. In addition, the RAN device sends a first response to the positioning device, where the first response includes a measurement result of the uplink SRS.

It can be learned that according to the method provided in this embodiment of this application, the RAN device stops measuring the uplink SRS and reporting the corresponding measurement result under a condition of the measurement interval specified by the positioning device, to avoid resource waste and signaling overheads caused because the RAN device cannot stop periodic measurement and periodic reporting due to a reason of the positioning device.

In a possible implementation, that the RAN device measures an uplink SRS of a terminal device based on the measurement periodicity and the measurement interval includes: The RAN device measures the uplink SRS based on the measurement periodicity; and after an interval of measuring the uplink SRS by the RAN device reaches the measurement interval, the RAN device stops measuring the uplink SRS.

In a possible implementation, that the RAN device sends a first response to the positioning device includes: After an interval of measuring the uplink SRS by the RAN device reaches the measurement interval, the RAN device stops sending the first response to the positioning device.

In a possible implementation, the measurement result of the uplink SRS includes at least one of the following parameters: signal strength of the uplink SRS received by the RAN device, information about time of arrival of the uplink SRS received by the RAN device, or information about an angle of arrival of the uplink SRS received by the RAN device.

In a possible implementation, the RAN device includes any one of the following devices: a serving RAN device of the terminal device, a first central unit (CU) connected to a serving distributed unit (DU) of the terminal device, a first CU-CP included in the first CU, a neighboring-cell RAN device of the terminal device, a second central unit (CU) connected to a neighboring-cell DU of the terminal device, or a second CU-CP included in the second CU.

In a possible implementation, the positioning device is a location management function (LMF).

In a possible implementation, the first message is an NR positioning protocol A (NRPPa) measurement request message.

In a possible implementation, the first response is an NRPPa measurement report message.

According to a fourth aspect, a positioning device sends a first message to a radio access network (RAN) device, where the first message is used by the positioning device to request the RAN device to perform uplink measurement, and the first message includes a measurement periodicity and a measurement interval. The positioning device receives a first response from the RAN device, where the first response includes a measurement result of an uplink sounding reference signal (SRS).

It can be learned that according to the method provided in this embodiment of this application, the positioning device indicates the RAN device to stop measuring the uplink SRS and reporting the corresponding measurement result under a condition of the specified measurement interval, to avoid resource waste and signaling overheads caused because the RAN device cannot stop periodic measurement and periodic reporting due to a reason of the positioning device.

In a possible implementation, the measurement result of the uplink SRS includes at least one of the following parameters: signal strength of the uplink SRS received by the RAN device, information about time of arrival of the uplink SRS received by the RAN device, or information about an angle of arrival of the uplink SRS received by the RAN device.

In a possible implementation, the RAN device includes any one of the following devices: a serving RAN device of a terminal device, a first central unit (CU) connected to a serving distributed unit (DU) of the terminal device, a first CU-CP included in the first CU, a neighboring-cell RAN device of the terminal device, a second central unit (CU) connected to a neighboring-cell DU of the terminal device, or a second CU-CP included in the second CU.

In a possible implementation, the positioning device is a location management function (LMF).

In a possible implementation, the first message is an NR positioning protocol A (NRPPa) measurement request message.

In a possible implementation, the first response is an NRPPa measurement report message.

According to a fifth aspect, this application provides an uplink measurement management method. The method includes: A radio access network (RAN) device receives a first message from a positioning device, where the first message is used by the positioning device to request the RAN device to perform uplink measurement, and the first message includes a measurement periodicity and an SRS-reference signal received power RSRP threshold. The RAN device measures an uplink SRS of a terminal device based on the measurement periodicity and the SRS-RSRP threshold. In addition, the RAN device sends a first response to the positioning device, where the first response includes a measurement result of the uplink SRS.

It can be learned that according to the method provided in this embodiment of this application, the RAN device stops measuring the uplink SRS and reporting the corresponding measurement result under a condition of the SRS-RSRP threshold specified by the positioning device, to avoid resource waste and signaling overheads caused because the RAN device cannot stop periodic measurement and periodic reporting due to a reason of the positioning device.

In a possible implementation, that the RAN device measures an uplink SRS of a terminal device based on the measurement periodicity and the SRS-RSRP threshold includes: The RAN device measures the uplink SRS based on the measurement periodicity; and when an SRS-RSRP received by the RAN device is less than the SRS-RSRP threshold, the RAN device stops measuring the uplink SRS.

In a possible implementation, that the RAN device sends a first response to the positioning device includes: When an SRS-RSRP received by the RAN device is less than the SRS-RSRP threshold, the RAN device stops sending the first response to the positioning device.

In a possible implementation, the measurement result of the uplink SRS includes at least one of the following parameters: signal strength of the uplink SRS received by the RAN device, information about time of arrival of the uplink SRS received by the RAN device, or information about an angle of arrival of the uplink SRS received by the RAN device.

In a possible implementation, the RAN device includes any one of the following devices: a serving RAN device of the terminal device, a first central unit (CU) connected to a serving distributed unit (DU) of the terminal device, a first CU-CP included in the first CU, a neighboring-cell RAN device of the terminal device, a second central unit (CU) connected to a neighboring-cell DU of the terminal device, or a second CU-CP included in the second CU.

In a possible implementation, the positioning device is a location management function (LMF).

In a possible implementation, the first message is an NR positioning protocol A (NRPPa) measurement request message.

In a possible implementation, the first response is an NRPPa measurement report message.

According to a sixth aspect, a positioning device sends a first message to a radio access network (RAN) device, where the first message is used by the positioning device to request the RAN device to perform uplink measurement, and the first message includes a measurement periodicity and an SRS-reference signal received power RSRP threshold. The positioning device receives a first response from the RAN device, where the first response includes a measurement result of an uplink sounding reference signal (SRS).

It can be learned that according to the method provided in this embodiment of this application, the positioning device indicates the RAN device to stop measuring the uplink SRS and reporting the corresponding measurement result under a condition of the specified SRS-RSRP threshold, to avoid resource waste and signaling overheads caused because the RAN device cannot stop periodic measurement and periodic reporting due to a reason of the positioning device.

In a possible implementation, the measurement result of the uplink SRS includes at least one of the following parameters: signal strength of the uplink SRS received by the RAN device, information about time of arrival of the uplink SRS received by the RAN device, or information about an angle of arrival of the uplink SRS received by the RAN device.

In a possible implementation, the RAN device includes any one of the following devices: a serving RAN device of a terminal device, a first central unit (CU) connected to a serving distributed unit (DU) of the terminal device, a first CU-CP included in the first CU, a neighboring-cell RAN device of the terminal device, a second central unit (CU) connected to a neighboring-cell DU of the terminal device, or a second CU-CP included in the second CU.

In a possible implementation, the positioning device is a location management function (LMF).

In a possible implementation, the first message is an NR positioning protocol A (NRPPa) measurement request message.

In a possible implementation, the first response is an NRPPa measurement report message.

According to a seventh aspect, this application provides an uplink measurement management method. The method includes: A radio access network (RAN) device receives a second message from a positioning device, where the second message is used to indicate the RAN device to abort measurement of an uplink sounding reference signal (SRS) sent by a terminal device. The RAN device sends a second response to the positioning device, where the second response is used to indicate that the RAN device successfully receives the second message.

It can be learned that according to the method provided in this embodiment of this application, bidirectional exchange of measurement abort indication information between the RAN device and an LMF is implemented, thereby ensuring that the LMF confirms that the RAN device correctly receives the measurement abort indication, and reducing resource waste and signaling overheads caused when the RAN device continues periodic measurement and periodic reporting because the RAN device does not correctly receive the measurement abort indication.

In a possible implementation, the RAN device includes any one of the following devices: a serving RAN device of the terminal device, a first central unit (CU) connected to a serving distributed unit (DU) of the terminal device, a first central unit-control plane unit (CU-CP) included in the first CU, a neighboring-cell RAN device of the terminal device, a second central unit (CU) connected to a neighboring-cell DU of the terminal device, or a second CU-CP included in the second CU.

In a possible implementation, the positioning device is a location management function (LMF).

In a possible implementation, the second message is a measurement abort message.

In a possible implementation, the second response is a measurement abort response message or a measurement abort acknowledgement message.

According to an eighth aspect, this application provides an uplink measurement management method. The method includes: A positioning device sends a second message to a radio access network (RAN) device, where the second message is used to indicate the RAN device to abort measurement of an uplink sounding reference signal (SRS) sent by a terminal device. The positioning device receives a second response from the RAN device, where the second response is used to indicate that the RAN device successfully receives the second message.

It can be learned that according to the method provided in this embodiment of this application, bidirectional exchange of measurement abort indication information between the RAN device and an LMF is implemented, thereby ensuring that the LMF confirms that the RAN device correctly receives the measurement abort indication, and reducing resource waste and signaling overheads caused when the RAN device continues periodic measurement and periodic reporting because the RAN device does not correctly receive the measurement abort indication.

In a possible implementation, the RAN device includes any one of the following devices: a serving RAN device of the terminal device, a first central unit (CU) connected to a serving distributed unit (DU) of the terminal device, a first central unit-control plane (CU-CP) included in the first CU, a neighboring-cell RAN device of the terminal device, a second central unit (CU) connected to a neighboring-cell DU of the terminal device, or a second CU-CP included in the second CU.

In a possible implementation, the positioning device is a location management function (LMF).

In a possible implementation, the second message is a measurement abort message.

In a possible implementation, the second response is a measurement abort response message or a measurement abort acknowledgement message.

According to a ninth aspect, this application provides an uplink measurement management method. The method includes: A radio access network (RAN) device determines to abort measurement of an uplink sounding reference signal (SRS) sent by a terminal device. The RAN device sends a third message to a positioning device, where the third message is used to indicate the RAN device to abort measurement of the uplink SRS.

It can be learned that according to the method provided in this embodiment of this application, the RAN device actively stops measuring the uplink SRS and reporting a corresponding measurement result based on a status of the RAN device, to effectively utilize resources of the RAN device.

In a possible implementation, the RAN device includes any one of the following devices: a serving RAN device of the terminal device, a first central unit (CU) connected to a serving distributed unit (DU) of the terminal device, a first central unit-control plane unit (CU-CP) included in the first CU, a neighboring-cell RAN device of the terminal device, a second central unit (CU) connected to a neighboring-cell DU of the terminal device, or a second CU-CP included in the second CU.

In a possible implementation, the positioning device is a location management function (LMF).

In a possible implementation, the third message is a measurement abort notification message or a measurement abort indication message.

According to a tenth aspect, a radio access network (RAN) device is provided, and is configured to perform the method according to any one of the first aspect or the possible implementations of the first aspect, the method according to any one of the third aspect or the possible implementations of the third aspect, the method according to any one of the fifth aspect or the possible implementations of the fifth aspect, the method according to any one of the seventh aspect or the possible implementations of the seventh aspect, or the method according to any one of the ninth aspect or the possible implementations of the ninth aspect. Specifically, the RAN device may include units configured to perform the method according to any one of the first aspect or the possible implementations of the first aspect, any one of the third aspect or the possible implementations of the third aspect, any one of the fifth aspect or the possible implementations of the fifth aspect, any one of the seventh aspect or the possible implementations of the seventh aspect, or any one of the ninth aspect or the possible implementations of the ninth aspect.

According to an eleventh aspect, a positioning device is provided, and is configured to perform the method according to any one of the second aspect or the possible implementations of the second aspect, the method according to any one of the fourth aspect or the possible implementations of the fourth aspect, the method according to any one of the sixth aspect or the possible implementations of the sixth aspect, or the method according to any one of the eighth aspect or the possible implementations of the eighth aspect. Specifically, the positioning device may include units configured to perform the method according to any one of the second aspect or the possible implementations of the second aspect, any one of the fourth aspect or the possible implementations of the fourth aspect, any one of the sixth aspect or the possible implementations of the sixth aspect, or any one of the eighth aspect or the possible implementations of the eighth aspect.

According to a twelfth aspect, a computer program product is provided. The computer program product includes computer program code. When the computer program code is run by a communication unit and a processing unit, or a transceiver and a processor of a communication device (for example, a radio access network device or a positioning device), the communication device is enabled to perform the method according to any one of the first to the ninth aspects or the possible implementations of the first to the ninth aspects.

According to a thirteenth aspect, a computer-readable storage medium is provided. The computer-readable storage medium stores a program, and the program enables a computer to perform the method according to any one of the first to the ninth aspects or the possible implementations of the first to the ninth aspects.

According to a fourteenth aspect, an embodiment of this application provides a chip. The chip is coupled to a memory, and performs the method according to any one of the first aspect or the possible designs of the first aspect, any one of the second aspect or the possible designs of the second aspect, any one of the third aspect or the possible designs of the third aspect, any one of the fourth aspect or the possible designs of the fourth aspect, any one of the fifth aspect or the possible designs of the fifth aspect, any one of the sixth aspect or the possible designs of the sixth aspect, any one of the seventh aspect or the possible designs of the seventh aspect, any one of the eighth aspect or the possible designs of the eighth aspect, or any one of the ninth aspect or the possible designs of the ninth aspect in embodiments of this application.

These aspects or other aspects of the present disclosure are more concise and more intelligible in descriptions in the following (plurality of) embodiments.

BRIEF DESCRIPTION OF DRAWINGS

The following briefly describes the accompanying drawings used in embodiments of this application.

DESCRIPTION OF EMBODIMENTS

The following describes embodiments of this application with reference to the accompanying drawings in embodiments of this application.

In this application, the word "example" is used to represent "giving an example, an illustration, or a description". Any embodiment described as an "example" in this application should not be explained as being more preferred or having more advantages than another embodiment. For the purpose that any person skilled in the art can implement and use the present disclosure, the following descriptions are provided. In the following descriptions, details are listed for the purpose of explanation. It should be understood that, a person of ordinary skill in the art may learn that the present disclosure can also be implemented without using these specific details. In other instances, well-known structures and processes are not described in detail, to avoid obscuring the descriptions of the present disclosure with unnecessary details. Therefore, the present disclosure is not limited to the described embodiments but extends to the widest scope that complies with the principles and features disclosed in this application.

In the disclosure, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in appropriate circumstances so that embodiments of this application described herein can be implemented in other orders than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

The terms "system" and "network" may be used interchangeably in this disclosure.

Specific embodiments are used below to describe in detail the technical solutions of the present disclosure. The following several specific embodiments may be combined with each other, and a same or similar concept or process may not be described repeatedly in some embodiments.

Figure 1:
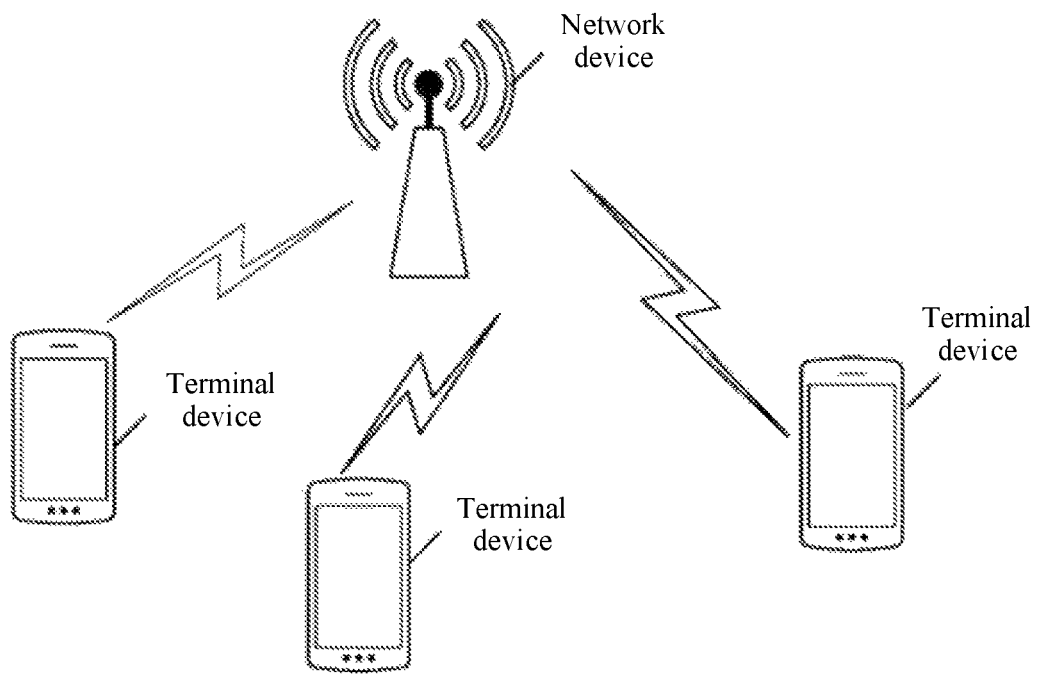
FIG. 1 is a schematic diagram of an architecture of a communication system according to an embodiment of this application.

The following describes embodiments of this application with reference to the accompanying drawings. FIG. 1 is a schematic diagram of an architecture of a communication system to which an embodiment of this application is applied. It should be understood that the technical solutions in embodiments of this application may be applied to various communication systems, for example, a long term evolution (LTE) system, an LTE frequency division duplex (FDD) system, an LTE time division duplex (TDD) system, a code division multiple access (CDMA) system, a universal mobile telecommunications system (UMTS), a wireless local area network (WLAN), a 5th generation (5G) mobile communication system, a new radio (NR) communication system, a communication system based on an orthogonal frequency division multiplexing (OFDM) technology, or a next generation (NG) communication system, for example, 6G. This application is described by using a 5G system as an example, but is not limited to the 5G system. A person of ordinary skill in the art may learn that, as a new service scenario emerges and a network architecture evolves, the technical solutions provided in embodiments of this application are also applicable to a similar technical problem.

The communication system shown in FIG. 1 includes a network device (where for simplicity, FIG. 1 shows only one network device, and there may be one or more network devices in an actual system) and a terminal device (where for simplicity, FIG. 1 shows only three terminal devices, and there may be one or more terminal devices in an actual system), and the network device provides a service for the terminal device. It should be understood that FIG. 1 is merely a schematic diagram. FIG. 1 shows only a network device used as a radio access network (RAN) device. The communication system may further include another network device, for example, may further include a core network (CN) device, a network management device, a network controller, and a relay device. The RAN device shown in FIG. 1 may correspond to a same physical station or two different physical stations (for example, a macro base station and a micro base station), and different stations may communicate with each other.

In embodiments of this application, the RAN device is an apparatus deployed in a radio access network to provide a wireless communication function for the terminal device. The RAN device may include various forms. For example, the RAN device may be a next-generation base station, for example, a next-generation NodeB (gNB) or a next-generation evolved NodeB (ng-eNB), or may be an access point (AP) in a wireless local area network (WLAN), an evolved NodeB (eNB or eNodeB) in LTE, a relay station or an access point, a vehicle-mounted device and a wearable device, or the like. One RAN device has one or more transmission reception points (TRPs). It should be understood that the terminal device communicates with the RAN device by using a transmission resource (for example, a frequency domain resource, a time domain resource, or a code domain resource) used in one or more cells managed by the network device. The cell may be a macro cell, a hyper cell, or a small cell. The small cell herein may include a metro cell, a micro cell, a pico cell, a femto cell, or the like. These small cells are characterized by small coverage and low transmit power, and are applicable to providing a high-rate data transmission service. The terminal device shown in FIG. 1 may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device may be a station (ST) in a WLAN, a cellular phone, a cordless phone, a SIP phone, a wireless local loop (WLL) station, a personal digital assistant (PDA) device, a tablet computer (pad), a handheld device or computer with a wireless communication function, a relay device, a computing device or another processing device coupled to a wireless modem, a vehicle-mounted device, a wearable device, a terminal device in a next-generation communication system, for example, a terminal device in a 5G network or a terminal device in a future evolved public land mobile network (PLMN), or the like. By way of example but not limitation, in embodiments of this application, the terminal device may alternatively be a virtual reality (VR) terminal device, an augmented reality (AR) terminal device, a wireless terminal device in industrial control, a wireless terminal device in self driving, a wireless terminal device in telemedicine (telemedicine), a wireless terminal device in a smart grid, a wireless terminal device in transportation safety, a wireless terminal device in a smart city, a wireless terminal device in a smart home, a navigation apparatus, an internet of things (IoT) apparatus, or a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

Figure 2:
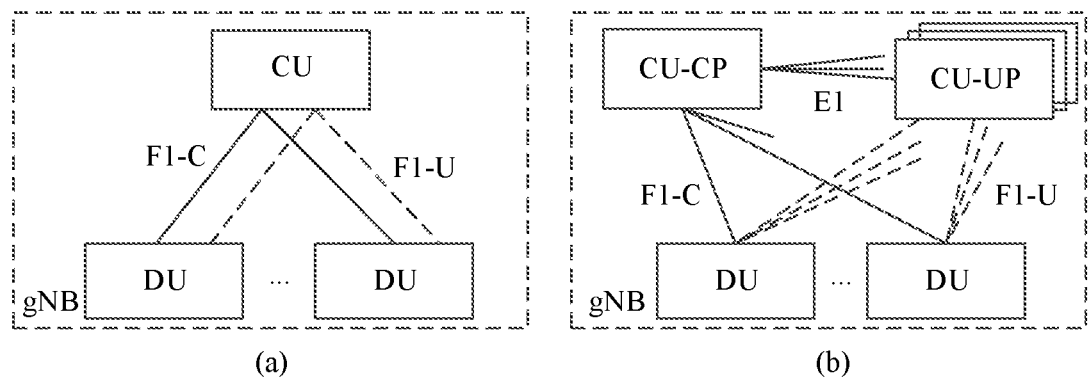
FIG. 2 is a schematic diagram of an architecture of a gNB divided into a CU and a DU according to an embodiment of this application.

Optionally, in a 5G system, a RAN device (for example, a gNB) may be further divided into a central unit (CU) and a distributed unit (DU) based on a protocol stack. The CU and the DU may be separately deployed on different physical devices. The CU is responsible for operations of an RRC layer, an SDAP layer, and a PDCP layer, and the DU is responsible for operations of an RLC layer, a MAC layer, and a PHY layer. FIG. 2(a) shows an architecture of a gNB divided into a CU and a DU. One gNB may include one CU and one or more DUs, and the one or more DUs are controlled by the CU. One DU is connected to the CU through a control plane interface (for example, F1-C), to transmit control plane data. One DU is connected to the CU through a user plane interface (for example, F1-U), to transmit user plane data. Further, the CU may be classified into a central unit-control plane (namely, a central unit-control plane CU-CP network element) and a central unit-user plane (namely, a central unit-user plane CU-UP network element). The CU-CP and the CU-UP may also be separately deployed on different physical devices, the CU-CP is responsible for control plane processing at the RRC layer and the PDCP layer, and the CU-UP is responsible for user plane processing at the SDAP layer and the PDCP layer. FIG. 2(b) shows an architecture of a gNB divided into a CU-CP, a CU-UP, and a DU. One gNB may include one CU-CP, one or more CU-UPs, and one or more DUs. One CP-UP is connected to only one CU-CP through a control plane interface (for example, E1), to transmit control plane data. One DU is connected to only one CU-CP through a control plane interface (for example, F1-C), to transmit control plane data. Under control of the CU-CP, one DU may be connected to one or more CU-UPs, one CU-UP may also be connected to one or more DUs, and the CU-UP is connected to the DU through a user plane interface (for example, F1-U), to transmit user plane data. It should be noted that, to maintain network elasticity, one DU or one CU-UP may alternatively be connected to a plurality of CU-CPs. In this case, the plurality of CU-CPs serve as backups for each other. During actual application, only one CU-CP runs at a moment. It should be understood that, for an architecture of the RAN device divided into the CU and the DU, the foregoing protocol stack division manner in which the RAN device is divided into the CU and the DU is merely an example, and the RAN device may alternatively be divided into the CU and the DU in another division manner. For example, the CU may be responsible for operations of the RRC layer, the SDAP layer, the PDCP layer, and the RLC layer, and the DU is responsible for operations of a MAC layer and a PHY layer. Alternatively, the CU is responsible for operations of the RRC layer and the SDAP layer, and the DU is responsible for operations of the PDCP layer, the RLC layer, a MAC layer, and a PHY layer. Similarly, the protocol stack division manner in which the CU is divided into the CU-CP and the CU-UP is also changeable. This is not specifically limited in this application.

Figure 3:
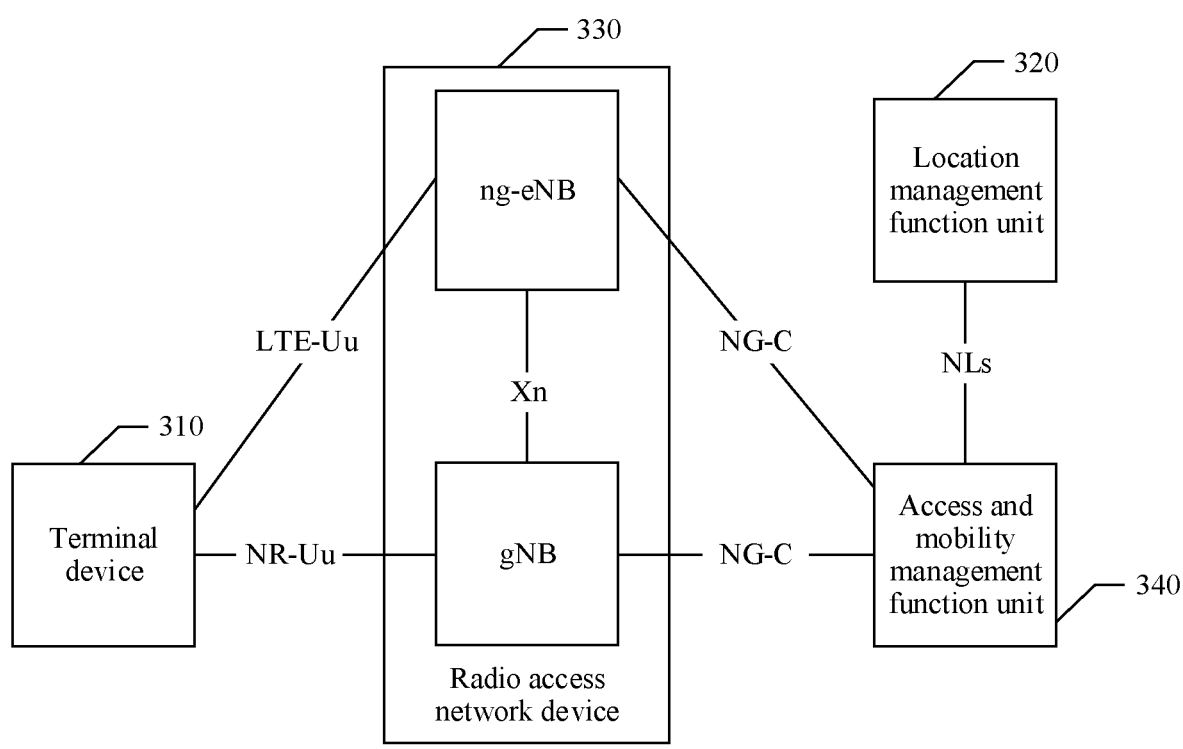
FIG. 3 is a schematic diagram of an architecture of a positioning system according to an embodiment of this application.

For example, the communication system provided in embodiments of this application may use a 5G technology. FIG. 3 is a schematic diagram of an architecture of a positioning system according to an embodiment of this application. The positioning system includes a terminal device 310, a RAN device 330, and a CN device. The RAN device 330 may be, for example, a gNB or an ng-eNB. The CN device includes, for example, an access and mobility management function (AMF) unit 340 and a location management function (LMF) unit 320. There is a communication connection between the terminal device 310 and the RAN device 330. Specifically, wireless communication is performed between the terminal device 310 and the gNB through an NR-Uu air interface, and wireless communication is performed between the terminal device 310 and the ng-eNB through an LTE-Uu air interface. It should be understood that the RAN device 330 shown in FIG. 3 is an example. In an actual network, a RAN may include one or more gNBs, may include one or more ng-eNBs, or may include a combination of one or more gNBs and ng-eNBs. Different RAN devices in the RAN may communicate with each other through an Xn interface, the RAN device 330 (the gNB or the ng-eNB) communicates with the AMF unit 340 through an NG-C interface, and the AMF unit 340 is equivalent to a router through which the gNB communicates with the LMF unit 320. The LMF unit 320 implements location estimation of the terminal device 310, and the AMF unit 340 communicates with the LMF unit 320 through an NLs interface.

Positioning of a terminal device is one of important functions of a 5G system. In the 3GPP R16 release, a plurality of terminal device positioning technologies are defined. The technologies include an uplink measurement-based positioning technology, for example, a positioning technology based on an uplink sounding reference signal (SRS)-reference signal received power (RSRP), an uplink-time difference of arrival (UL-TDOA), an uplink-angle of arrival (UL-AoA), and the like. In the uplink SRS-RSRP-based technology, for example, one or more RAN devices or TRPs of the one or more RAN devices separately receive an uplink SRS sent by the terminal device, measure a received RSRP, and report a measurement result to the LMF, and the LMF calculates a physical location of the terminal device based on an SRS-RSRP reported by each cell. In this disclosure, the SRS-RSRP is also referred to as received signal strength of an SRS. In the UL-TDOA technology, for example, a plurality of cells of one or more RAN devices separately receive an uplink SRS sent by the terminal device, measure an uplink-relative time of arrival (UL-RTOA), and report a measurement result to the LMF, and the LMF calculates a physical location of the terminal device based on a UL-RTOA reported by each cell. In this disclosure, the UL-RTOA is also referred to as information about time of arrival of an uplink SRS. In the UL-AoA technology, for example, a plurality of cells of one or more RAN devices separately receive an uplink SRS sent by the terminal device, measure an azimuth angle of arrival (AoA) and/or a zenith angle of arrival (ZoA), and report a measurement result to the LMF, and the LMF calculates a physical location of the terminal device based on an AoA and/or a ZoA reported by each cell. In this disclosure, the UL-AoA is also referred to as information about an angle of arrival of an uplink SRS. It should be noted that the foregoing uplink measurement-based positioning technology is described in detail in the 3GPP TS38.305 technical specification. Details are not described herein in this application.

In the foregoing uplink measurement-based positioning method, the LMF usually needs to first obtain an uplink SRS configuration sent by a to-be-positioned terminal device, and send the uplink SRS configuration to one or more RAN devices used to assist in positioning the terminal device. The RAN device (these RAN devices) measures (measure), based on the uplink SRS configuration, the uplink SRS sent by the terminal device, to obtain a measurement quantity, for example, an SRS-RSRP, a UL-RTOA, or a UL-AoA, and reports (report) a corresponding measurement result to the LMF, and the LMF determines a physical location of the terminal device through calculation, to position the terminal device. Usually, the LMF needs the RAN device (these RAN devices) to perform a plurality of times of measurement, and uses a plurality of measurement results to accurately position the terminal device. It should be understood that in a plurality of measurement processes, measurement results of a same RAN device at different time may be different due to mobility of the terminal device and/or a time-varying characteristic of a radio channel. The LMF may effectively position the terminal device by using measurement results reported by these RAN devices for a plurality of times. Therefore, the LMF may indicate the RAN device (these RAN devices) to periodically measure the uplink SRS of the terminal device and report the measurement result, and the LMF calculates the physical location of the terminal device based on the periodically reported measurement result. After completing positioning of the terminal device, the LMF indicates the RAN device (these RAN devices) to stop measurement. It is found that, for a periodic measurement manner, after the LMF indicates the RAN device (these RAN devices) to perform periodic measurement and reporting, there may be problems that the LMF needs to be restarted due to a fault or another reason, a data loss occurs on the LMF, and so on. As a result, the LMF loses information previously used to indicate the RAN device to perform periodic measurement, and cannot normally manage the RAN device (these RAN devices). In this case, the RAN device (these RAN devices) continuously performs (perform) periodic measurement and reports (report) a corresponding measurement result based on a periodicity previously indicated by the LMF. This results in radio resource waste and a large amount of signaling overheads. Therefore, embodiments of this application provide an uplink measurement configuration technical solution. Further, the technical solution in embodiments of this application is further applied to an architecture of a RAN device having a CU and a DU. The CU may further include a CU-CP and a CU-UP that are separated.

Figure 4:
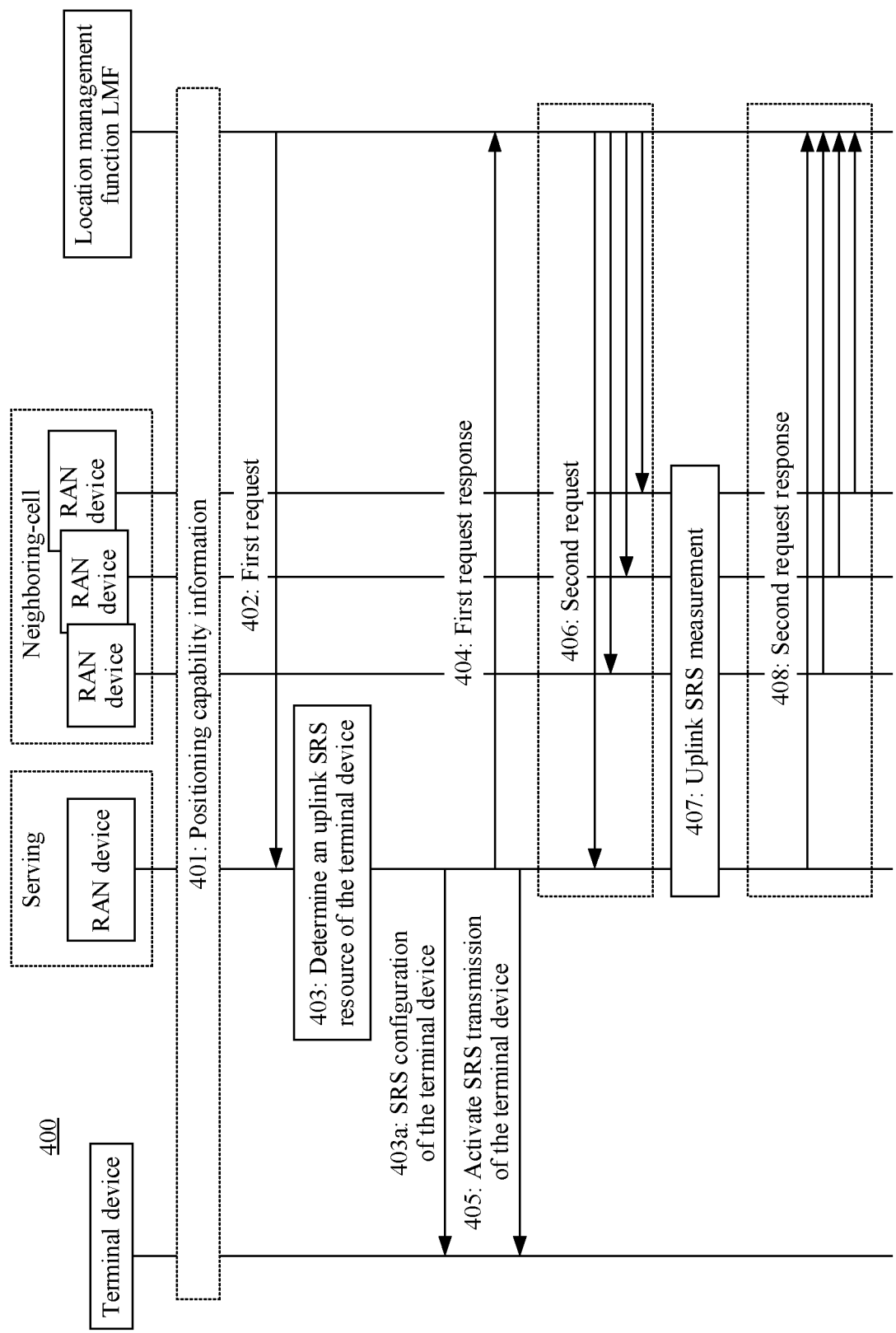
FIG. 4 is a schematic flowchart of a terminal device positioning method in a 5G system according to an embodiment of this application.
Figure 5:
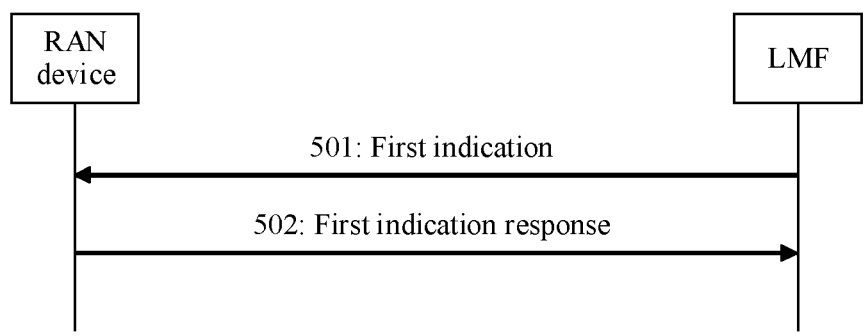
FIG. 5 is another schematic flowchart of a terminal device positioning method in a 5G system according to an embodiment of this application.
Figure 6:
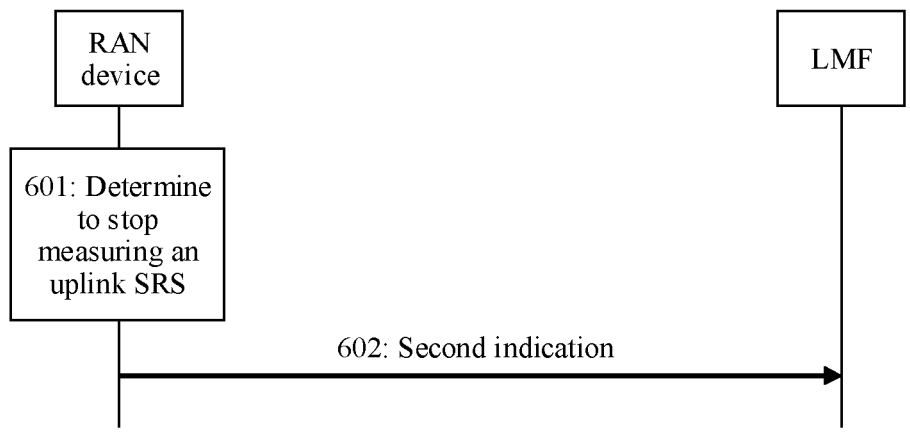
FIG. 6 is still another schematic flowchart of a terminal device positioning method in a 5G system according to an embodiment of this application.

This disclosure provides the following several embodiments. The following describes in detail the technical solutions of this application with reference to FIG. 4 to FIG. 6 by using specific method embodiments. The following several specific embodiments may be combined with each other, and a same or similar concept or process may not be described repeatedly in some embodiments. It should be noted that FIG. 4 to FIG. 6 are schematic flowcharts of method embodiments of this application, and show detailed communication operations or operations of the method. However, these operations or operations are merely examples. Other operations or variants of various operations in FIG. 4 to FIG. 6 may be further performed in embodiments of this application. In addition, the operations in FIG. 4 to FIG. 6 may be performed in a sequence different from that presented in FIG. 4 to FIG. 6, and not all operations in FIG. 4 to FIG. 6 may be performed.

FIG. 4 is a schematic flowchart of a terminal device positioning method in a 5G system according to an embodiment of this application. The method 400 is based on an uplink positioning technology, and is applied to interaction between a terminal device, one or more RAN devices, and an LMF. A procedure in FIG. 4 includes the following operations.

S401: The LMF obtains positioning capability information of the terminal device from the terminal device.

In this operation, the LMF interacts with the terminal device to obtain a positioning capability of the terminal device. It should be understood that the terminal device is a to-be-positioned terminal device. For example, the LMF may obtain the positioning capability information of the terminal device by using an LTE positioning protocol (LPP) capability transfer (LPP capability transfer) procedure, for example, a positioning method supported by the terminal device or a capability (for example, supported bandwidth) related to a specific positioning method of the terminal device. Specifically, for the LPP capability transfer procedure, refer to descriptions in the 3GPP TS37.355 technical specification. Details are not described herein in this application.

It should be noted that operation S401 is optional. In a possible implementation, the LMF may obtain the positioning capability information of the terminal device from another device before the positioning procedure, for example, obtain and store the positioning capability information of the terminal device from an AMF. In another possible implementation, the LMF may obtain and store the positioning capability information of the terminal device in a registration procedure of the terminal device. In addition, the LMF may alternatively obtain and store the positioning capability information of the terminal device in another procedure. Alternatively, the LMF uses default positioning capability information. In other words, the LMF considers by default that each terminal device has preset positioning capability information.

S402: The LMF sends a first request to a serving RAN device of the terminal device. Correspondingly, the serving RAN device of the terminal device receives the first request.

The first request is used to request to obtain an uplink SRS configuration of the terminal device.

In this operation, the LMF requests, from the serving RAN device of the terminal device, an uplink SRS resource configured by the serving RAN device for the terminal device. For example, the uplink SRS configuration includes an SRS sending periodicity, an SRS sequence carrier spacing, a cyclic prefix type, a frequency location, a quantity of symbols, and the like. It should be understood that the uplink SRS configuration corresponds to a resource used by the terminal device to send an uplink SRS, namely, an uplink SRS resource. It should be noted that a serving RAN device of a terminal device is a RAN device that currently provides a service for the terminal device. In addition, there are other RAN devices nearby the serving RAN device that provide services for other terminal devices, and these other RAN devices may be referred to as neighboring-cell RAN devices of the serving RAN device.

It should be noted that in the 3GPP R15 release, an NR positioning protocol A (NRPPa) that is used between the LMF and the RAN device to perform a positioning-related signaling procedure is defined. Optionally, the first request is an NRPPa positioning information request message.

S403: The serving RAN device determines the uplink SRS resource of the terminal device.

In this operation, that the serving RAN device of the terminal device determines the resource used by the terminal device to send the uplink SRS may also mean that the serving RAN device determines the uplink SRS configuration of the terminal device.

S403a: The serving RAN device sends the uplink SRS configuration to the terminal device. Correspondingly, the terminal device receives the uplink SRS configuration sent by the serving RAN device.

In this operation, the serving RAN device configures, for the terminal device, the uplink SRS resource determined in operation S403, so that the terminal device subsequently sends the uplink SRS by using the corresponding uplink SRS configuration.

S404: The serving RAN device sends a first request response to the LMF.

Correspondingly, the LMF receives the first request response from the serving RAN device. The first request response is a response of the serving RAN device to the first request sent by the LMF.

The first request response is used to provide uplink information of the terminal device for the LMF. For example, the uplink information is the uplink SRS resource configured by the serving RAN device for the terminal device, namely, the uplink SRS configuration. The LMF may obtain, by using the first request response, the uplink SRS configuration used by the terminal device to subsequently send the uplink SRS.

Optionally, the first request response is an NRPPa positioning information response message.

S405: The serving RAN device activates uplink SRS transmission of the terminal device.

In this operation, the serving RAN device activates the terminal device to send the uplink SRS on the configured uplink SRS resource. After receiving an activation message, the terminal device starts to send the uplink SRS based on the uplink SRS configuration obtained in operation S403a.

Optionally, the serving RAN device activates the uplink SRS transmission of the terminal device by using a physical downlink control channel message or a MAC control element.

It should be noted that operations S402 to S405 are optional. In the terminal device positioning procedure based on the uplink positioning technology, information exchange between the neighboring-cell RAN device and the LMF is not involved in operations S402 to S405. In addition, operations S402 to S405 may also be applied to another procedure, for example, a procedure in which the serving RAN device measures quality of a channel between the serving RAN device and the terminal device.

S406: The LMF sends a second request to the RAN device. Correspondingly, the RAN device receives the second request sent by the LMF.

The second request includes a measurement periodicity and a measurement amount. The second request is used by the LMF to request the RAN device to perform uplink SRS measurement. Optionally, the second request includes one or more of the following measurement quantities: an SRS-RSRP, a UL-AoA, or a UL-RTOA. Further, the second request may further include an uplink SRS configuration.

In this operation, in a possible implementation, the LMF sends the second request to the serving RAN device of the terminal device. Optionally, the second request is used to request a plurality of TRPs in the serving RAN device to perform uplink SRS measurement, and the plurality of TRPs are TRPs that are selected by the LMF to assist in positioning the terminal device. In another possible implementation, the LMF separately sends the second request to the serving RAN device of the terminal device and one or more neighboring-cell RAN devices. Optionally, the second request is used to request the serving RAN device and the one or more neighboring-cell RAN devices to perform uplink SRS measurement, and the one or more neighboring-cell RAN devices are RAN devices that are selected by the LMF to assist in positioning the terminal device. Optionally, the second request is used to request a plurality of TRPs in the serving RAN device and the one or more neighboring-cell RAN devices to perform uplink SRS measurement, and the plurality of TRPs are TRPs that are selected by the LMF to assist in positioning the terminal device. Specifically, the LMF may select, according to a first policy, the plurality of RAN devices or the plurality of TRPs used to measure the uplink SRS sent by the terminal device. The first policy may be diversified, for example, deployed in a plurality of RAN devices nearby the serving RAN device, or a plurality of TRPs of the serving RAN device, or a plurality of RAN devices or a plurality of TRPs having good radio link quality with the terminal device. This is not limited in this embodiment of this application. It should be understood that before this operation, the LMF may learn of identities (IDs) of TRPs in the serving RAN device and the neighboring-cell RAN device. The second request may include the IDs of the TRPs selected by the LMF to assist in positioning the terminal device.

Optionally, the second request includes a measurement identity, to identify a request of the LMF for periodic measurement of the terminal device.

The second request includes the measurement periodicity. To be specific, in the second request, the LMF indicates a periodicity of uplink SRS measurement performed by the RAN device, and the periodicity is a value greater than 0. For example, the measurement periodicity may be 120 ms, 240 ms, 480 ms, 640 ms, or the like. The second request includes the measurement amount (measurement number). To be specific, in the second request, the LMF indicates a quantity of times that the RAN device performs uplink SRS measurement, and the measurement amount is an integer greater than or equal to 1. For example, the measurement amount may be 4, 8, 16, 32, 64, or the like. Table 1 shows an information element (IE) that includes the measurement periodicity and the measurement amount in the second request.

TABLE 1

IE included in the second request

| IE/Group Name | Presence | Range | IE type and reference |
|---|---|---|---|
| Report Characteristics | M | | ENUMERATED (OnDemand, Periodic, . . . ) |
| Measurement Periodicity | C-ifReport-Characteristics-Periodic | | ENUMERATED (120 ms, 240 ms, 480 ms, 640 ms, 1024 ms, 2048 ms, 5120 ms, 10240 ms, 1 min, 6 min, 12 min, 30 min, 60 min, . . . ) |
| Measurement Number | C-ifReport-Characteristics-Periodic | | INTEGER (1 . . . 64 . . . ) |

In Table 1, "Report Characteristics" is an IE, of an enumeration type, that identifies report characteristics, where the report characteristics may include on-demand (OnDemand) and periodic (Periodic) types. "Measurement Periodicity" is an IE, of a conditional enumeration type, that identifies a measurement periodicity, and is valid when "Report Characteristics" is "Periodic", in other words, valid when "C-ifReportCharacteristicsPeriodic" exists. Similarly, "Measurement Number" is an IE that identifies a measurement amount and whose value is an integer greater than or equal to 1, and is valid when "Report Characteristics" is "Periodic", in other words, valid when "C-ifReportCharacteristicsPeriodic" exists, where a value of the measurement amount may be an integer ranging from 1 to 64 in the example in Table 1.

Optionally, the second request is an NRPPa measurement request message.

S407: The RAN device performs uplink SRS measurement.

In this operation, in a possible implementation, in operation S406, the serving RAN device that receives the second request indicates, based on the uplink SRS configuration, the measurement periodicity, and the measurement amount in the second request, the plurality of TRPs to periodically measure the SRS sent by the terminal device. In another possible implementation, in operation S406, each of the plurality of RAN devices that receive the second request periodically measures, based on the uplink SRS configuration, the measurement periodicity, and the measurement amount in the second request, the SRS sent by the terminal device. In still another possible implementation, in operation S406, each of the plurality of RAN devices that receive the second request indicates, based on the uplink SRS configuration, the measurement periodicity, and the measurement amount in the second request, one or more TRPs of the RAN device to periodically measure the SRS sent by the terminal device. It should be noted that the neighboring-cell RAN device may obtain the uplink SRS configuration of the terminal device from the serving RAN device in another manner, for example, may obtain the uplink SRS configuration through information exchange between RAN devices. In this case, the second request may not include the uplink SRS configuration. For example, one or more of the following measurement quantities: the SRS-RSRP, the UL-AoA, or the UL-RTOA may be obtained by measuring the SRS sent by the terminal device. It should be understood that the RAN device sequentially and periodically measures the uplink SRS and obtains corresponding measurement information based on the measurement periodicity and the measurement amount that are indicated in the second request. After the measurement amount is reached, the RAN device no longer performs uplink SRS measurement. For example, when the measurement periodicity is 120 ms and the measurement amount is 8, after receiving the second request, the RAN device measures the uplink SRS at an interval of 120 ms, and performs the measurement for eight consecutive times.

S408: The RAN device sends a second request response to the LMF. Correspondingly, the LMF receives the second request response from the RAN device. The second request response is a response of the serving RAN device to the second request sent by the LMF.

The second request response is used by the RAN device to report a measurement result of the uplink SRS to the LMF.

In this operation, the RAN device reports, to the LMF, the result of measuring the uplink SRS by the RAN device or by the one or more TRPs of the RAN device. For example, the measurement result includes one or more of the following measurement quantities: the SRS-RSRP, the UL-AoA, or the UL-RTOA. It should be understood that the RAN device sequentially and periodically reports the measurement result of the uplink SRS to the LMF based on the measurement periodicity and the measurement amount that are indicated in the second request. After the measurement amount is reached, the RAN device no longer reports the measurement result to the LMF. For example, when the measurement periodicity is 120 ms and the measurement amount is 8, after receiving the second request, the RAN device measures the uplink SRS at an interval of 120 ms to obtain measurement information, reports the measurement result of the uplink SRS to the LMF, and performs the reporting for eight consecutive times.

Optionally, the second request response is an NRPPa measurement response message.

In operation S406, the LMF indicates, in the second request, the measurement amount of the RAN device, so that the RAN device can stop measuring the uplink SRS and reporting the corresponding measurement result after an amount of measuring the uplink SRS sent by the terminal device reaches the measurement amount. In another possible implementation, in operation S406, the second request sent by the LMF to the RAN device includes a measurement periodicity and a measurement interval. To be specific, in the second request, the LMF indicates an interval in which the RAN device periodically performs uplink SRS measurement and reports a corresponding measurement result, and the measurement interval is an integer greater than 0. For example, the measurement interval may be 1200 ms, 2400 ms, 3600 ms, or the like. Table 2 shows an IE that includes the measurement periodicity and the measurement interval in the second request.

TABLE 2

Another IE included in the second request

| IE/Group Name | Presence | Range | IE type and reference |
|---|---|---|---|
| Report Characteristics | M | | ENUMERATED (OnDemand, Periodic, . . . ) |
| Measurement Periodicity | C-ifReport-Characteristics-Periodic | | ENUMERATED (120 ms, 240 ms, 480 ms, 640 ms, 1024 ms, 2048 ms, 5120 ms, 10240 ms, 1 min, 6 min, 12 min, 30 min, 60 min, . . . ) |

TABLE 2-continued

Another IE included in the second request

| IE/Group Name | Presence | Range | IE type and reference |
|---|---|---|---|
| Measurement Interval | C-ifReport-Characteristics-Periodic | | ENUMERATED (1200 ms, 2400 ms, 4800 ms, 6400 ms, 10240 ms, 20480 ms, 51200 ms, 102400 ms, 10 min, 60 min, 120 min, 300 min, 600 min, . . . ) |

In Table 2, "Measurement Interval" is an IE, of a conditional enumeration type, that identifies a measurement interval, and is valid when "Report Characteristics" is "Periodic", in other words, valid when "C-ifReportCharacteristicsPeriodic" exists, where a value of the measurement interval may be 1200 ms, 2400 ms, 4800 ms, or the like in the example in Table 2. In this case, in operation S407, the RAN device no longer measures the uplink SRS after the measurement interval is reached. For example, when the measurement periodicity is 120 ms and the measurement interval is 1200 ms, after receiving the second request, the RAN device measures the uplink SRS at an interval of 120 ms, and stops measurement after performing the measurement for 10 consecutive times. Similarly, in operation S408, the RAN device no longer reports the measurement result to the LMF after the measurement interval is reached.

In still another possible implementation, in operation S406, the second request sent by the LMF to the RAN device includes a measurement periodicity and an SRS-RSRP threshold. The SRS-RSRP threshold is used to indicate the RAN device to stop measuring the uplink SRS of the terminal device and reporting a corresponding measurement result when the RAN device detects that strength of the uplink SRS of the terminal device is lower than the SRS-RSRP threshold. To be specific, in the second request, the LMF indicates the SRS-RSRP threshold for the RAN device to periodically perform uplink SRS measurement and report the corresponding measurement result. For example, a signal strength threshold may be −80 dbm, −90 dbm, −100 dbm, or the like. Table 3 shows an IE that includes the measurement periodicity and the RSRP threshold in the second request.

TABLE 3

Still another IE included in the second request

| IE/Group Name | Presence | Range | IE type and reference |
|---|---|---|---|
| Report Characteristics | M | | ENUMERATED (OnDemand, Periodic, . . . ) |
| Measurement Periodicity | C-ifReport-Characteristics-Periodic | | ENUMERATED (120 ms, 240 ms, 480 ms, 640 ms, 1024 ms, 2048 ms, 5120 ms, 10240 ms, 1 min, 6 min, 12 min, 30 min, 60 min, . . . ) |
| SRS-RSRP Threshold | C-ifReport-Characteristics-Periodic | | ENUMERATED (−80 dbm, −90 dbm, −100 dbm, . . . ) |

In Table 3, "SRS-RSRP Threshold" is an IE of an SRS-RSRP threshold of a conditional enumeration type, and is valid when "Report Characteristics" is "Periodic", that is, valid when "C-ifReportCharacteristicsPeriodic" exists, where a value of the SRS-RSRP threshold may be −80 dbm, −90 dbm, −100 dbm, or the like in the example in Table 3. In this case, in operation S407, when detecting, through measurement, that the strength of the uplink SRS-RSRP of the terminal device is lower than the threshold, the RAN device no longer performs uplink SRS measurement. Similarly, in operation S408, when detecting, through measurement, that the strength of the uplink SRS-RSRP of the terminal device is lower than the threshold, the RAN device no longer reports the measurement result to the LMF.

Optionally, after a quantity of times of periodically measuring the uplink SRS by the serving RAN device reaches the measurement amount indicated in the second request, the serving RAN device may indicate the terminal device to stop sending the uplink SRS. For example, the serving RAN device indicates, by using a radio resource control (RRC) reconfiguration message, the terminal device to stop sending the uplink SRS.

It should be noted that, when the RAN device is in a CU-DU separated architecture, for example, information exchange between the LMF and a CU and between the CU and a DU is performed in operations S402, S404, S406, and S408. The CU in operation S402 is a CU connected to a serving DU of the terminal device. In a possible implementation, the CU performs operation S403 and sends the uplink SRS configuration to the terminal device through the serving DU in operation S403a, and the CU activates, through the serving DU, the terminal device in operation S405 to send the uplink SRS. In another possible implementation, the serving DU performs operations S403, S403a, and S405, and sends the uplink SRS configuration to the CU. DUs in the plurality of RAN devices perform uplink SRS measurement in operation S407, and report measurement results to CUs respectively connected to the DUs through F1-C interfaces. Then, the CUs report the measurement results to the LMF in operation S408. It should be understood that different DUs in the plurality of RAN devices may be respectively connected to different CUs, or different DUs may be connected to a same CU. Further, when the CU includes a CU-CP and a CU-UP, the operations performed by the CU in the foregoing operations are changed to be performed by the CU-CP included in the CU.

According to the foregoing operations in this embodiment, the RAN device can stop measuring the uplink SRS and reporting the corresponding measurement result under a given condition, to avoid resource waste and signaling overheads caused because the RAN device cannot stop periodic measurement and periodic reporting due to a reason of the LMF.

According to operations S401 to S408 in the foregoing embodiment, the LMF may obtain the measurement information of the plurality of RAN devices and/or the plurality of TRPs for the terminal device, and determine a location of the terminal device based on the plurality of pieces of measurement information. Usually, in a manner in which the RAN device periodically reports the measurement result of the uplink SRS to the LMF, after the LMF determines the physical location of the terminal device, the LMF needs to indicate the one or more RAN devices to abort measurement. Optionally, the LMF separately sends a measurement abort message to the one or more RAN devices, to indicate each RAN device to stop measurement. After receiving the measurement abort message, each RAN device no longer measures the uplink SRS and reports the measurement result of the uplink SRS. In this case, if the RAN device unsuccessfully receives the measurement abort message from the LMF, the RAN device continues to measure the uplink SRS and report the corresponding measurement result. This results in resource waste and system overheads that are unnecessary.

FIG. 5 is another schematic flowchart of a terminal device positioning method in a 5G system according to an embodiment of this application. The method 500 is based on an uplink positioning technology, and is applied to interaction between one or more RAN devices and an LMF that assist in positioning a terminal device. A procedure in FIG. 5 includes the following operations.

S501: The LMF sends a first indication to the RAN device. Correspondingly, the RAN device receives the first indication from the LMF.

The first indication is used to indicate the RAN device to abort measurement.

In this operation, the LMF sends the first indication to the RAN device, to indicate the RAN device to abort uplink SRS measurement on the terminal device and reporting of a corresponding SRS measurement result.

It should be understood that the RAN device is one of the plurality of RAN devices configured to assist in positioning the terminal device. For example, the RAN device is the RAN device that receives the second request from the LMF in operation S406 in the foregoing embodiment.

In a possible implementation, the first indication includes a measurement ID, to indicate that the RAN device stops the measurement identified by the measurement ID. For example, the measurement ID is the same as the measurement ID obtained by the RAN device in operation S406 in the foregoing embodiment.

Optionally, the first indication is a measurement abort message.

S502: The RAN device sends a first indication response to the LMF. Correspondingly, the LMF receives the first indication response from the RAN device. The first indication response is a response of a serving RAN device to the first indication sent by the LMF.

In this operation, the RAN device sends the first indication response to the LMF, to notify the LMF that the RAN device successfully receives the first indication from the LMF. After sending the first indication response, the RAN device no longer measures the uplink SRS and reports the corresponding measurement result, or indicates one or more TRPs of the RAN device to no longer perform uplink SRS measurement and report the corresponding measurement result.

In a possible implementation, the first indication response includes the measurement ID in the first indication, and is used to confirm that the RAN device successfully receives the first indication for the measurement identified by the measurement ID.

Optionally, the first indication response is a measurement abort response message or a measurement abort acknowledgement message.

It should be noted that, after the LMF sends the first indication, if the LMF does not receive, under a preset condition, the first indication response sent by the RAN device, the LMF may continue to send the first indication until the LMF receives the first indication response sent by the RAN device. Optionally, the preset condition is a preset time period. To be specific, if the LMF does not receive, within the preset time period, the first indication response sent by the RAN device, the LMF continues to send the first indication to the RAN device.

It should be noted that, when the RAN device is in a CU-DU separated architecture, the LMF sends the first indication to a CU, and the CU transfers the first indication to a DU; and the DU sends the first indication response to the CU, and the CU transfers the first indication response to the LMF. Further, when the CU includes a CU-CP and a CU-UP, the operations performed by the CU in the foregoing operations are changed to be performed by the CU-CP included in the CU.

According to the foregoing operations in this embodiment, bidirectional exchange of measurement abort indication information between the RAN device and the LMF is implemented, thereby ensuring that the LMF confirms that the RAN device correctly receives a measurement abort indication, and reducing resource waste and signaling overheads caused when the RAN device continues periodic measurement and periodic reporting because the RAN device does not correctly receive the measurement abort indication.

In the foregoing embodiment, the LMF determines when the RAN device stops measuring the uplink SRS and reporting the corresponding measurement result. For example, the LMF indicates a quantity of times of uplink SRS measurement performed by the RAN device, or indicates an interval of uplink SRS measurement performed by the RAN device, or indicates to abort uplink SRS measurement. In another possible implementation, the RAN device determines when to stop measuring the uplink SRS and reporting the corresponding measurement result. In this implementation, the RAN device may determine, based on a resource status of the RAN device, when to no longer perform uplink SRS measurement and report the corresponding measurement result.

FIG. 6 is still another schematic flowchart of a terminal device positioning method in a 5G system according to an embodiment of this application. The method 600 is based on an uplink positioning technology, and is applied to interaction between one or more RAN devices and an LMF that assist in positioning a terminal device. A procedure in FIG. 6 includes the following operations.

S601: The RAN device determines to stop measuring an uplink SRS.

In this operation, the RAN device decides to no longer perform uplink SRS measurement. Specifically, the RAN device determines, according to a second policy, to no longer perform uplink SRS measurement. The second policy may be diversified. For example, the RAN device determines that received SRS strength of the terminal device is lower than a preset threshold; or the RAN device determines that a quantity of times or an interval of measuring the uplink SRS exceeds a preset threshold; or a resource of the RAN device is overloaded and no idle resource is used to assist in positioning the terminal device. This is not limited in this embodiment of this application. It should be understood that the second policy may be generated by the RAN device, or may be obtained by the RAN device from another network device.

S602: The RAN device sends a second indication to the LMF. Correspondingly, the LMF receives the second indication from the RAN device.

The second indication is used to indicate the RAN device to stop measuring the uplink SRS.

In this operation, the RAN device stops measuring the uplink SRS, and notifies the LMF that the RAN device no longer measures the uplink SRS and reports a corresponding measurement result.

In a possible implementation, the second indication includes a measurement ID, and the measurement ID is the same as the measurement ID obtained by the RAN device in operation S406 in the foregoing embodiment, and indicates that the RAN device stops the uplink SRS measurement indicated by the measurement ID.

Optionally, the second indication is a measurement abort notification message or a measurement abort indication message.

It should be noted that, when the RAN device is in a CU-DU separated architecture, in a possible implementation, a CU determines to stop measuring the uplink SRS in operation S601, and indicates, through an F1-C interface, a DU to stop measuring the uplink SRS of the terminal device. In operation S602, information exchange between the LMF and the CU is performed. In another possible implementation, in operation S601, the DU determines to stop measuring the uplink SRS, and sends the second indication to the LMF through the CU. Further, when the CU includes a CU-CP and a CU-UP, the operations performed by the CU in the foregoing operations are changed to be performed by the CU-CP included in the CU.

According to the foregoing operations in this embodiment, the RAN device actively stops measuring the uplink SRS and reports the corresponding measurement result based on a status of the RAN device, to effectively utilize resources of the RAN device.

It should be noted that, in this embodiment of this application, the LMF configured for location management may alternatively be another device. The another device may be a controller or a managing device configured to manage location information of the terminal device in a network, or may be referred to as a positioning device. The positioning device may be located in a RAN or may be located in a CN. A name and a location of the positioning device are not specifically limited in this application.

All or a part of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid-state drive (SSD)), or the like. A person skilled in the art may use different methods to implement the described functions for each particular application, but it should not be considered that the implementation goes beyond the scope of this application.

The foregoing describes in detail the method embodiments of this application with reference to FIG. 4 to FIG. 6. The following describes in detail apparatus embodiments of this application with reference to FIG. 7 to FIG. 10. It should be understood that, the apparatus embodiments and the method embodiments correspond to each other, and for similar descriptions, refer to the method embodiments. It should be noted that, the apparatus embodiments may be used in cooperation with the foregoing methods, or may be separately used.

Figure 7:
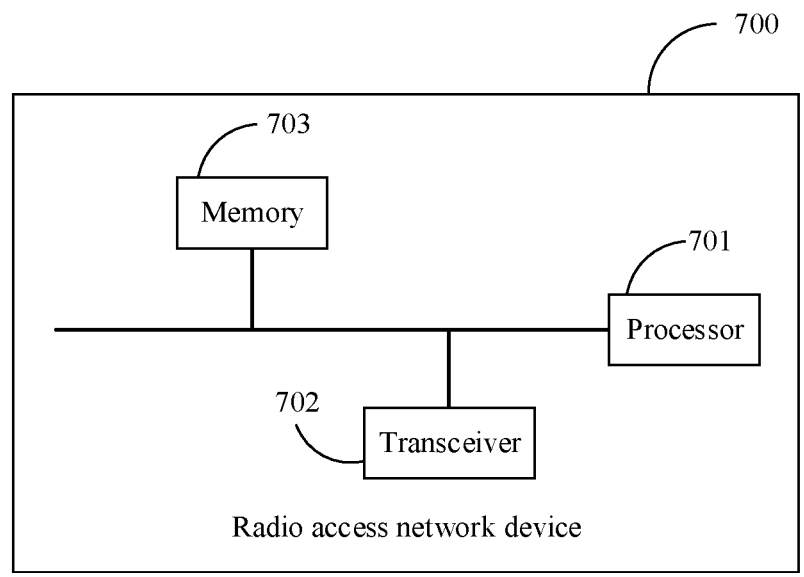
FIG. 7 is a schematic block diagram of a RAN device according to an embodiment of this application.

FIG. 7 is a schematic block diagram of a RAN device 700 according to an embodiment of this application. The RAN device 700 may correspond to (for example, may be configured as or may be) the RAN device described in the method 400, the RAN device described in the method 500, the RAN device described in the method 600, or the RAN device described in another implementation. The RAN device 700 may include a processor 701 and a transceiver 702. The processor 701 is communicatively coupled to the transceiver 702. Optionally, the RAN device 700 further includes a memory 703. The memory 703 is communicatively coupled to the processor 701. Optionally, the processor 701, the memory 703, and the transceiver 702 may be communicatively coupled. The memory 703 may be configured to store instructions. The processor 701 is configured to execute the instructions stored in the memory 703, to control the transceiver 702 to receive and/or send information or a signal. The processor 701 and the transceiver 702 are separately configured to perform actions or processing processes performed by the RAN device described in the method 400, the RAN device described in the method 500, the RAN device described in the method 600, or the RAN device described in another implementation. Herein, to avoid repetition, detailed descriptions are omitted. When the RAN device 700 is in a CU-DU separated architecture, the RAN device 700 shown in FIG. 7 may be a CU or a CU-CP.

Figure 8:
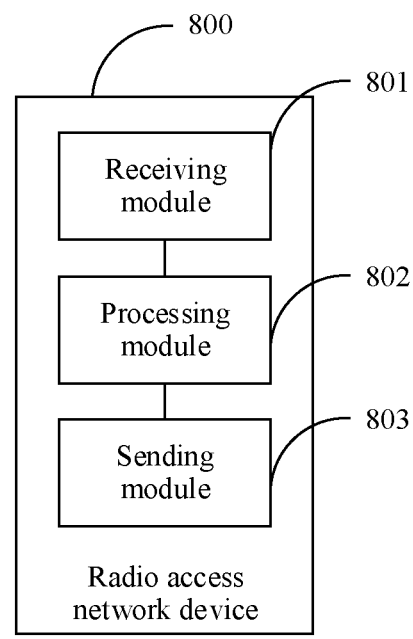
FIG. 8 is another schematic block diagram of a RAN device according to an embodiment of this application.

FIG. 8 is another schematic block diagram of a RAN device 800 according to an embodiment of this application. The RAN device 800 may correspond to (for example, may be configured as or may be) the RAN device described in the method 400, the RAN device described in the method 500, the RAN device described in the method 600, or the RAN device described in another implementation. The RAN device 800 may include a receiving module 801, a processing module 802, and a sending module 803. The processing module 802 is separately communicatively coupled to the receiving module 801 and the sending module 803. The RAN device 800 may be in a form shown in FIG. 7. The processing module 802 may be implemented through the processor 701 in FIG. 7, and the receiving module 801 and/or the sending module 803 may be implemented through the transceiver 702 in FIG. 7. The RAN device 800 may further include a storage unit, configured to store a program or data to be executed by the processing module 802, or store information received by the receiving module 801 and/or information sent by the sending module 803. The modules or units in the RAN device 800 are separately configured to perform actions or processing processes performed by the RAN device described in the method 400, the RAN device described in the method 500, the RAN device described in the method 600, or the RAN device described in another implementation. Herein, to avoid repetition, detailed descriptions are omitted. When the RAN device 800 is in a CU-DU separated architecture, the RAN device 800 shown in FIG. 8 may be a CU or a CU-CP.

Figure 9:
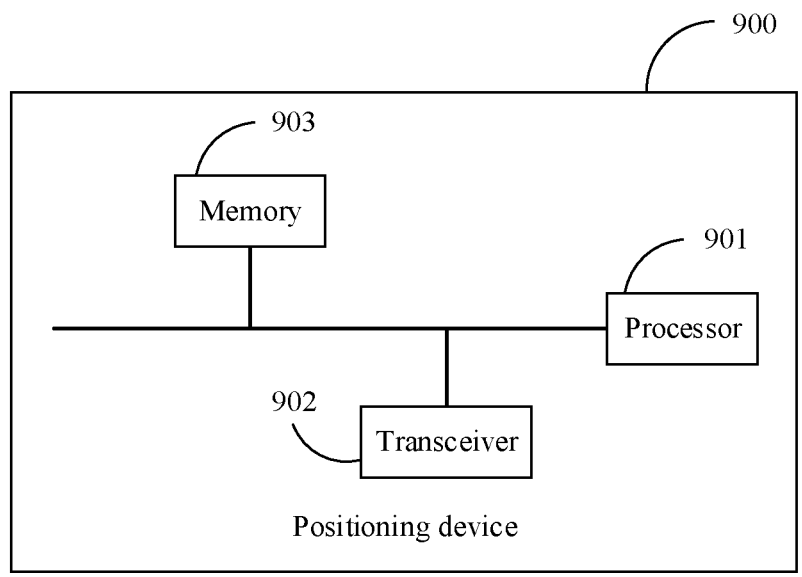
FIG. 9 is a schematic block diagram of a positioning device according to an embodiment of this application.

FIG. 9 is a schematic block diagram of a positioning device 900 according to an embodiment of this application. The positioning device 900 may correspond to (for example, may be configured as or may be) the LMF described in the method 400, the LMF described in the method 500, the LMF described in the method 600, or the LMF described in another implementation. The positioning device 900 may include a processor 901 and a transceiver 902. The processor 901 is communicatively coupled to the transceiver 902. Optionally, the positioning device 900 further includes a memory 903. The memory 903 is communicatively coupled to the processor 901. Optionally, the processor 901, the memory 903, and the transceiver 902 may be communicatively coupled. The memory 903 may be configured to store instructions. The processor 901 is configured to execute the instructions stored in the memory 903, to control the transceiver 902 to receive and/or send information or a signal. The processor 901 and the transceiver 902 are separately configured to perform actions or processing processes performed by the LMF described in the method 400, the LMF described in the method 500, the LMF described in the method 600, or the LMF described in another implementation. Herein, to avoid repetition, detailed descriptions are omitted.

Figure 10:
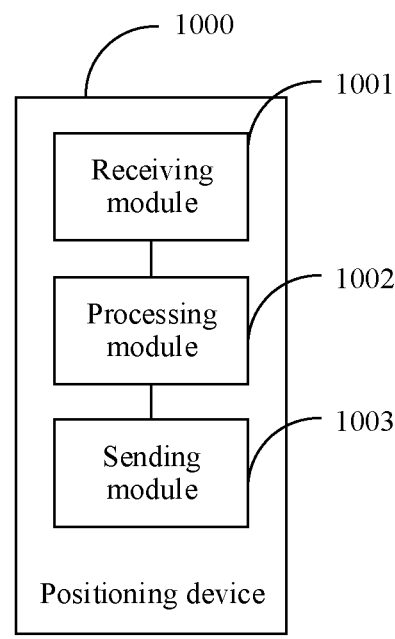
FIG. 10 is another schematic block diagram of a positioning device according to an embodiment of this application.

FIG. 10 is another schematic block diagram of a positioning device 1000 according to an embodiment of this application. The positioning device 1000 may correspond to (for example, may be configured as or may be) the LMF described in the method 400, the LMF described in the method 500, the LMF described in the method 600, or the LMF described in another implementation. The positioning device 1000 may include a receiving module 1001, a processing module 1002, and a sending module 1003. The processing module 1002 is separately communicatively coupled to the receiving module 1001 and the sending module 1003. The positioning device 1000 may be in a form shown in FIG. 9. The processing module 1002 may be implemented through the processor 901 in FIG. 9, and the receiving module 1001 and/or the sending module 1003 may be implemented through the transceiver 902 in FIG. 9. The positioning device 1000 may further include a storage unit, configured to store a program or data to be executed by the processing module 1002, or store information received by the receiving module 1001 and/or information sent by the sending module 1003. The modules or units in the positioning device 1000 are separately configured to perform actions or processing processes performed by the LMF described in the method 400, the LMF described in the method 500, the LMF described in the method 600, or the LMF described in other implementations. Herein, to avoid repetition, detailed descriptions are omitted.

It should be understood that the processor (701 or 901) in the apparatus embodiments of this application may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory (703 or 903) in the apparatus embodiments of this application may be a volatile memory such as a random access memory (RAM), or may be a non-volatile memory such as a read-only memory (ROM), a flash memory, a hard disk drive (HDD), or a solid-state drive (SSD), or may be a combination of the foregoing types of memories.

In the embodiments provided in this application, it should be understood that the disclosed apparatuses and methods may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication couplings may be implemented through some interfaces. The indirect couplings or communication couplings between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, function units in embodiments of this patent application may be integrated into one processing unit, or each of the units may exist alone physically, or two or more units may be integrated into one unit.

When functions are implemented in a form of a software function unit and sold or used as an independent product, the functions may be stored in a computer-readable storage medium. Based on such an understanding, the technical solutions of this patent application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this patent application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this patent application, but are not intended to limit the protection scope of this patent application. Any variation or replacement readily figured out by a person skilled in the art within the technical scope disclosed in this patent application shall fall within the protection scope of this patent application. Therefore, the protection scope of this patent application shall be subject to the protection scope of the claims.

What is claimed is:

1. An uplink measurement management method, comprising:
  receiving, by a radio access network (RAN) device, a first message from a positioning device, wherein the first message is used to request the RAN device to perform uplink measurement, and the first message comprises a measurement periodicity and a measurement amount;
  measuring, by the RAN device, an uplink sounding reference signal (SRS) of a terminal device based on the measurement periodicity and the measurement amount; and
  sending, by the RAN device, a first response to the positioning device, wherein the first response comprises a measurement result of the uplink SRS.

2. The method according to claim 1, wherein the measurement result of the uplink SRS comprises at least one of the following parameters: signal strength of the uplink SRS received by the RAN device, information about time of arrival of the uplink SRS received by the RAN device, or information about an angle of arrival of the uplink SRS received by the RAN device.

3. The method according to claim 1, wherein the RAN device comprises any one of the following devices: a serving RAN device of the terminal device, a first central unit (CU) connected to a serving distributed unit (DU) of the terminal device, a first central unit-control plane unit (CU-CP) comprised in the first CU, a neighboring-cell RAN device of the terminal device, a second CU connected to a neighboring-cell DU of the terminal device, or a second CU-CP comprised in the second CU.

4. The method according to claim 1, wherein the positioning device is a location management function (LMF).

5. The method according to claim 1, wherein the first message is a new radio positioning protocol A (NRPPa) measurement request message, and the first response is an NRPPa measurement report message.

6. An uplink measurement management method, comprising:
sending, by a positioning device, a first message to a radio access network (RAN) device, wherein the first message is used to request the RAN device to perform uplink measurement, and the first message comprises a measurement periodicity and a measurement amount; and
receiving, by the positioning device, a first response from the RAN device, wherein the first response comprises a measurement result of an uplink sounding reference signal (SRS).

7. The method according to claim 6, wherein the measurement result of the uplink SRS comprises at least one of the following parameters: signal strength of the uplink SRS received by the RAN device, information about time of arrival of the uplink SRS received by the RAN device, or information about an angle of arrival of the uplink SRS received by the RAN device.

8. The method according to claim 6, wherein the RAN device comprises any one of the following devices: a serving RAN device of a terminal device, a first central unit (CU) connected to a serving distributed unit (DU) of the terminal device, a first central unit-control plane unit (CU-CP) comprised in the first CU, a neighboring-cell RAN device of the terminal device, a second CU connected to a neighboring-cell DU of the terminal device, or a second CU-CP comprised in the second CU.

9. The method according to claim 6, wherein the positioning device is a location management function (LMF).

10. The method according to claim 6, wherein the first message is a new radio positioning protocol A (NRPPa) measurement request message, and the first response is an NRPPa measurement report message.

11. A radio access network (RAN) device, comprising:
a transceiver;
at least one processor; and
one or more memories coupled to the at least one processor and storing programming instructions that, when executed by the at least one processor, cause the RAN device to:
receive a first message from a positioning device, wherein the first message is used to request the RAN device to perform uplink measurement, and the first message comprises a measurement periodicity and a measurement amount;
measure an uplink sounding reference signal (SRS) of a terminal device based on the measurement periodicity and the measurement amount; and
send a first response to the positioning device, wherein the first response comprises a measurement result of the uplink SRS.

12. The RAN device according to claim 11, wherein the measurement result of the uplink SRS comprises at least one of the following parameters: signal strength of the uplink SRS received by the RAN device, information about time of arrival of the uplink SRS received by the RAN device, or information about an angle of arrival of the uplink SRS received by the RAN device.

13. The RAN device according to claim 11, wherein the RAN device comprises any one of the following devices: a serving RAN device of the terminal device, a first central unit (CU) connected to a serving distributed unit (DU) of the terminal device, a first central unit-control plane unit (CU-CP) comprised in the first CU, a neighboring-cell RAN device of the terminal device, a second CU connected to a neighboring-cell DU of the terminal device, or a second CU-CP comprised in the second CU.

14. The RAN device according to claim 11, wherein the first message is a new radio positioning protocol A (NRPPa) measurement request message, and the first response is an NRPPa measurement report message.

15. A positioning device, comprising:
a transceiver;
at least one processor; and
one or more memories coupled to the at least one processor and storing programming instructions that, when executed by the at least one processor, cause the positioning device to:
send a first message to a radio access network (RAN) device, wherein the first message is used to request the RAN device to perform uplink measurement, and the first message comprises a measurement periodicity and a measurement amount; and
receive a first response from the RAN device, wherein the first response comprises a measurement result of an uplink sounding reference signal (SRS).

16. The positioning device according to claim 15, wherein the measurement result of the uplink SRS comprises at least one of the following parameters: signal strength of the uplink SRS received by the RAN device, information about time of arrival of the uplink SRS received by the RAN device, or information about an angle of arrival of the uplink SRS received by the RAN device.

17. The positioning device according to claim 15, wherein the positioning device is a location management function (LMF).

18. The positioning device according to claim 15, wherein the first message is a new radio positioning protocol A (NRPPa) measurement request message, and the first response is an NRPPa measurement report message.

19. A communications system, comprising a radio access network (RAN) device and a positioning device, wherein
the RAN device, comprising:
a first transceiver;
at least one first processor; and
one or more first memories coupled to the at least one first processor and storing programming instructions that, when executed by the at least one first processor, cause the RAN device to:
receive a first message from the positioning device, wherein the first message is used by the positioning device to request the RAN device to perform uplink measurement, and the first message comprises a measurement periodicity and a measurement amount;
measure an uplink sounding reference signal (SRS) of a terminal device based on the measurement periodicity and the measurement amount; and send a first response to the positioning device, wherein the first response comprises a measurement result of the uplink SRS; and the positioning device, comprising:

a second transceiver;

at least one second processor; and one or more second memories coupled to the at least one second processor and storing programming instructions that, when executed by the at least one second processor, cause the positioning device to:

send the first message to the RAN device; and receive the first response from the RAN device.

20. The communications system according to claim 19, wherein the RAN device comprises any one of the following devices: a serving RAN device of the terminal device, a first central unit (CU) connected to a serving distributed unit (DU) of the terminal device, a first central unit-control plane unit (CU-CP) comprised in the first CU, a neighboring-cell RAN device of the terminal device, a second CU connected to a neighboring-cell DU of the terminal device, or a second CU-CP comprised in the second CU.

21. The communications system according to claim 19, wherein the positioning device is a location management function (LMF).

22. The communications system according to claim 19, wherein the measurement result of the uplink SRS comprises at least one of the following parameters: signal strength of the uplink SRS received by the RAN device, information about time of arrival of the uplink SRS received by the RAN device, or information about an angle of arrival of the uplink SRS received by the RAN device.

23. The communications system according to claim 19, wherein the first message is a new radio positioning protocol A (NRPPa) measurement request message, and the first response is an NRPPa measurement report message.

* * * * *